US012567613B2

(12) United States Patent
Long et al.

(10) Patent No.: US 12,567,613 B2
(45) Date of Patent: Mar. 3, 2026

(54) AIRCRAFT THERMAL MANAGEMENT SYSTEM FOR AN ENERGY STORAGE SYSTEM

(71) Applicant: Rolls-Royce Corporation, Indianapolis, IN (US)

(72) Inventors: Stephen Andrew Long, Indianapolis, IN (US); Michael Dougherty, Indianapolis, IN (US); Tomasz Marek Lubecki, Singapore (SG); Firman Sasongko, Singapore (SG); Chandana Jayampathi Gajanayake, Singapore (SG)

(73) Assignee: Rolls-Royce Corporation, Indianapolis, IN (US)

( * ) Notice: Subject to any disclaimer, the term of this patent is extended or adjusted under 35 U.S.C. 154(b) by 545 days.

(21) Appl. No.: 17/895,861

(22) Filed: Aug. 25, 2022

(65) Prior Publication Data

US 2024/0069527 A1     Feb. 29, 2024

(51) Int. Cl.
H01M 10/60          (2014.01)
B64D 27/10          (2006.01)
(Continued)

(52) U.S. Cl.
CPC ............ H01M 10/60 (2015.04); B64D 27/10 (2013.01); B64D 33/08 (2013.01); G05B 19/416 (2013.01);
(Continued)

(58) Field of Classification Search
CPC .. H01M 10/60; H01M 10/613; H01M 10/625; H01M 10/63; H01M 10/6568;
(Continued)

(56) References Cited

U.S. PATENT DOCUMENTS

| | | | |
|---|---|---|---|
| 10,906,658 B2 | 2/2021 | Long et al. | |
| 2008/0053100 A1 | 3/2008 | Venkataramani et al. | |

(Continued)

FOREIGN PATENT DOCUMENTS

| | | | |
|---|---|---|---|
| CN | 101962000 B | 8/2012 | |
| CN | 103407346 B | 3/2016 | |

(Continued)

*Primary Examiner* — Eric J Yoon

(74) *Attorney, Agent, or Firm* — Shumaker & Sieffert, P.A.

(57)     ABSTRACT

A thermal management system for an energy storage system for an aircraft includes a pump circulating a thermal management fluid through the thermal management system and an energy storage device of the aircraft. A controller circuitry may control a variable pumping capacity of the pump based on sensing pressure or temperature of the thermal management fluid at the energy storage device. The controller circuitry may default operation of the pump to a first pumping capacity in response to the pressure or temperature being within a predetermined operating range and a predetermined failure condition or a power demand of an aircraft engine supply bus exceeding a predetermined threshold. The controller controlling operation of the pump to a second pumping capacity in response to absence of the power demand signal of the aircraft engine supply bus and the pressure or temperature being within the predetermined operating range.

17 Claims, 8 Drawing Sheets

(51) Int. Cl.

| | |
|---|---|
| *B64D 33/08* | (2006.01) |
| *G05B 19/416* | (2006.01) |
| *G05D 16/20* | (2006.01) |
| *G05D 23/19* | (2006.01) |
| *H01M 10/613* | (2014.01) |
| *H01M 10/625* | (2014.01) |
| *H01M 10/63* | (2014.01) |
| *H01M 10/6568* | (2014.01) |
| *B64D 27/02* | (2006.01) |

(52) U.S. Cl.
CPC ..... *G05D 16/2066* (2013.01); *G05D 23/1917* (2013.01); *H01M 10/613* (2015.04); *H01M 10/625* (2015.04); *H01M 10/63* (2015.04); *H01M 10/6568* (2015.04); *B64D 27/026* (2024.01); *G05B 2219/37371* (2013.01); *G05B 2219/49215* (2013.01); *H01M 2220/20* (2013.01)

(58) Field of Classification Search
CPC ........... H01M 2220/20; H01M 10/486; H01M 8/04768; B64D 27/33; B64D 31/18; B64D 33/08; B64D 27/10; B64D 27/026; G05B 19/416; G05B 2219/37371; G05B 2219/49215; G05D 16/2066; G05D 23/1917; B60L 2240/36; B60L 58/24; B60L 2240/525; H02J 7/0031; H02J 7/007192; B60H 2001/00307; B60H 1/00885
See application file for complete search history.

(56) References Cited

U.S. PATENT DOCUMENTS

| | | | |
|---|---|---|---|
| 2009/0280395 A1 | 11/2009 | Nemesh et al. | |
| 2011/0118917 A1* | 5/2011 | Lim ......................... | B60K 6/48 |
| | | | 701/22 |
| 2011/0151344 A1* | 6/2011 | Heo .................... | H01M 8/0494 |
| | | | 429/430 |
| 2012/0295141 A1 | 11/2012 | Allen | |
| 2013/0082634 A1* | 4/2013 | Bokusky ................. | G05B 9/02 |
| | | | 318/563 |
| 2013/0286526 A1 | 10/2013 | Satoh et al. | |
| 2014/0216709 A1 | 8/2014 | Smith et al. | |
| 2015/0013306 A1 | 1/2015 | Shelley et al. | |
| 2015/0298024 A1 | 10/2015 | Watkins | |
| 2016/0229282 A1 | 8/2016 | Hettrich et al. | |
| 2016/0298883 A1 | 10/2016 | Louvar et al. | |
| 2017/0067388 A1 | 3/2017 | Murata et al. | |
| 2019/0105968 A1* | 4/2019 | Rice ........................ | B60L 58/26 |
| 2019/0173140 A1 | 6/2019 | Yokote et al. | |
| 2020/0023751 A1 | 1/2020 | Seo | |
| 2020/0031193 A1 | 1/2020 | Lee et al. | |
| 2020/0171975 A1 | 6/2020 | Ueda et al. | |
| 2020/0215931 A1 | 7/2020 | Ogaki et al. | |
| 2020/0303789 A1 | 9/2020 | Macdonald et al. | |
| 2021/0094489 A1* | 4/2021 | Damaraju ........... | B60R 16/0232 |
| 2021/0138868 A1 | 5/2021 | Bruneau et al. | |
| 2021/0162884 A1* | 6/2021 | Villanueva ........... | B60L 3/0046 |
| 2021/0323381 A1* | 10/2021 | Orihashi ............ | B60H 1/00485 |
| 2022/0025820 A1 | 1/2022 | Dalal | |
| 2022/0106053 A1 | 4/2022 | Snyder | |
| 2023/0249519 A1* | 8/2023 | Turudic .................. | B60L 15/02 |
| | | | 165/201 |
| 2024/0011437 A1 | 1/2024 | Long et al. | |
| 2024/0011438 A1 | 1/2024 | Long et al. | |

FOREIGN PATENT DOCUMENTS

| | | | |
|---|---|---|---|
| CN | 214887337 U | * | 11/2021 |
| EP | 2 804 188 B1 | | 12/2018 |
| EP | 3 480 114 B1 | | 3/2020 |
| WO | WO 2006/014307 A1 | | 2/2006 |
| WO | WO 2021/041209 A1 | | 3/2021 |

* cited by examiner

AIRCRAFT THERMAL MANAGEMENT SYSTEM FOR AN ENERGY STORAGE SYSTEM

TECHNICAL FIELD

This disclosure relates to electrical energy storage systems in hybrid aircraft and, in particular, to an electrical energy storage system having a thermal management system in an aircraft.

BACKGROUND

Batteries are used to store electric power. Typically, batteries supply their stored power as direct current (DC) voltage. The DC voltage may be converted to alternating current (AC) voltage, or may be used directly as a source of electric power for DC or AC loads. The electric power stored in batteries is depleted over a period of time according to the current flow out of the batteries. As the batteries are depleted, the voltage output of the batteries drops. Batteries may be recharged using power generated by another power source such as a battery charger being supplied AC power.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A thermal management system for an energy storage system for an aircraft includes a pump to circulate a thermal management fluid through at least part of the thermal management system and an energy storage device of the aircraft and controller circuitry. The controller circuitry may control a variable pumping capacity of the pump. The system may also include a sensor in communication with the controller circuitry. The sensor may sense pressure and/or temperature of the thermal management fluid at the energy storage device. The controller circuitry may default operation of the pump to a first pumping capacity in response to the pressure or temperature being within a predetermined operating range and at least one of a predetermined failure condition or a power demand for an aircraft engine supply bus exceeding a predetermined threshold. In addition, the controller may control operation of the pump to a second pumping capacity in response to absence of the power demand signal for the aircraft engine supply bus and the pressure or temperature being within the predetermined operating range.

One interesting feature of the systems and methods described below may be that the controller circuitry may control a variable speed of the pump to control the variable pumping capacity. Alternatively, or in addition, an interesting feature of the systems and methods described below may be that the controller circuitry may dynamically control the variable speed of the pump with a pulse width modulated control signal. Alternatively, or in addition, an interesting feature of the systems and methods described below may be that the controller circuitry may control the variable pumping capacity of the pump to any of a plurality of discrete speeds, such that the first pumping capacity is a first discrete speed of the pump, and the second pumping capacity is a second discrete speed of the pump.

Figure 1:
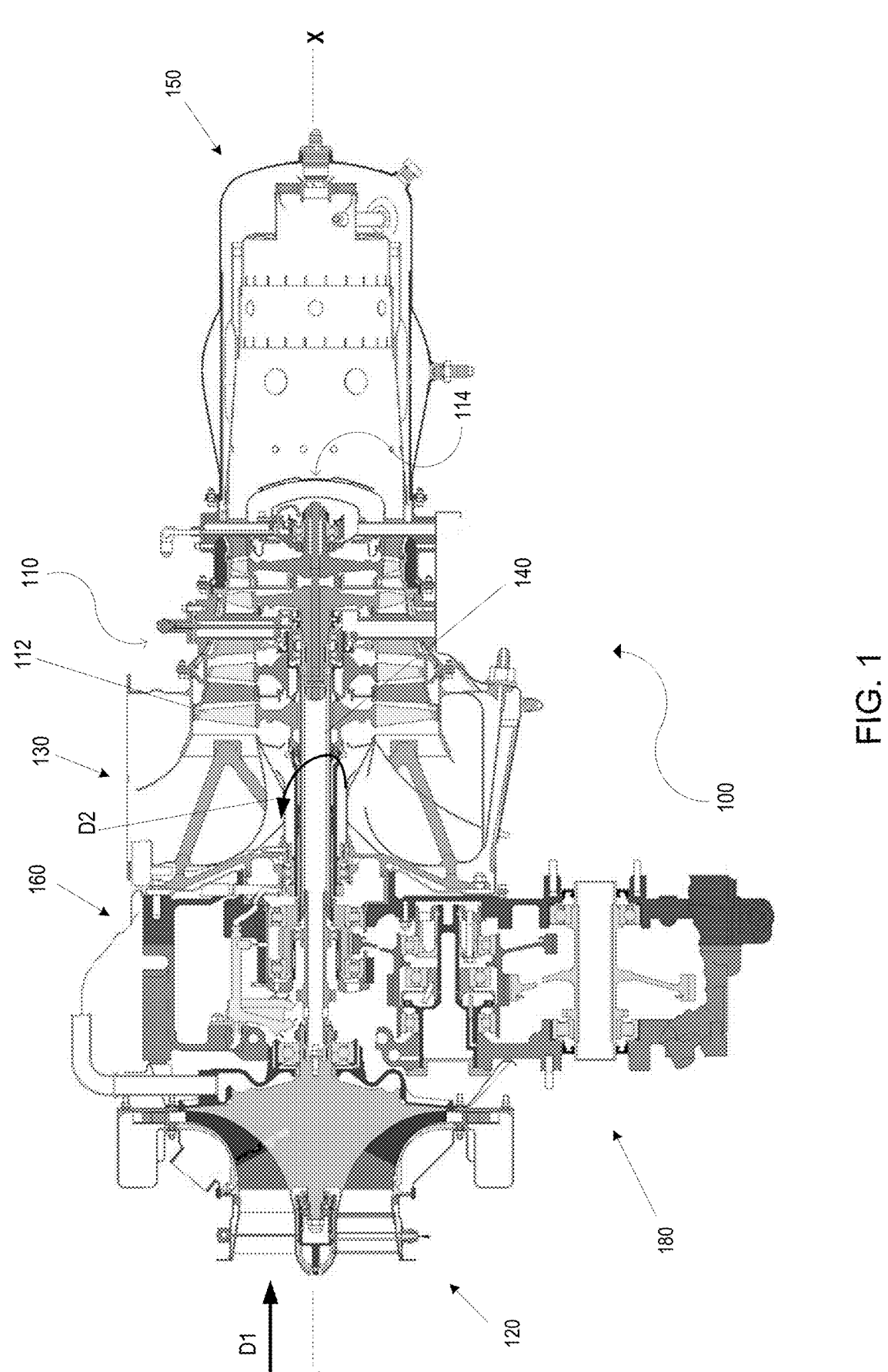
FIG. 1 is a cross-sectional view of an example gas turbine engine.

In connection with a hybrid electric system, FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned air vehicle, a fixed wing vehicle, a variable wing vehicle, a rotary wing vehicle, an unmanned combat aerial vehicle, a tailless aircraft, a hover craft, and any other airborne vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as a two-spool engine having a centrifugal compressor and axial flow gas generator and power turbine stages, in some forms the gas turbine engine 100 may have one or multiple spools and/or may be any form of axial flow engine or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples. In some examples, the gas turbine engine 100 may include a power transfer 180 in the form of a transmission or gearbox. The power transfer 180 may extract energy from the engine output in the form or torque at an angular velocity, and transfer such energy to other components within an aircraft. In an example of a helicopter or airplane, the power transfer 180 may transfer energy extracted from the engine to one or more propulsors. As used herein, the term "propulsor" or "propulsors" is defined as a helicopter rotor, an airplane propeller, a ducted fan, or other mechanical device that is rotational driven by a motor to provide propulsion.

Figure 2:
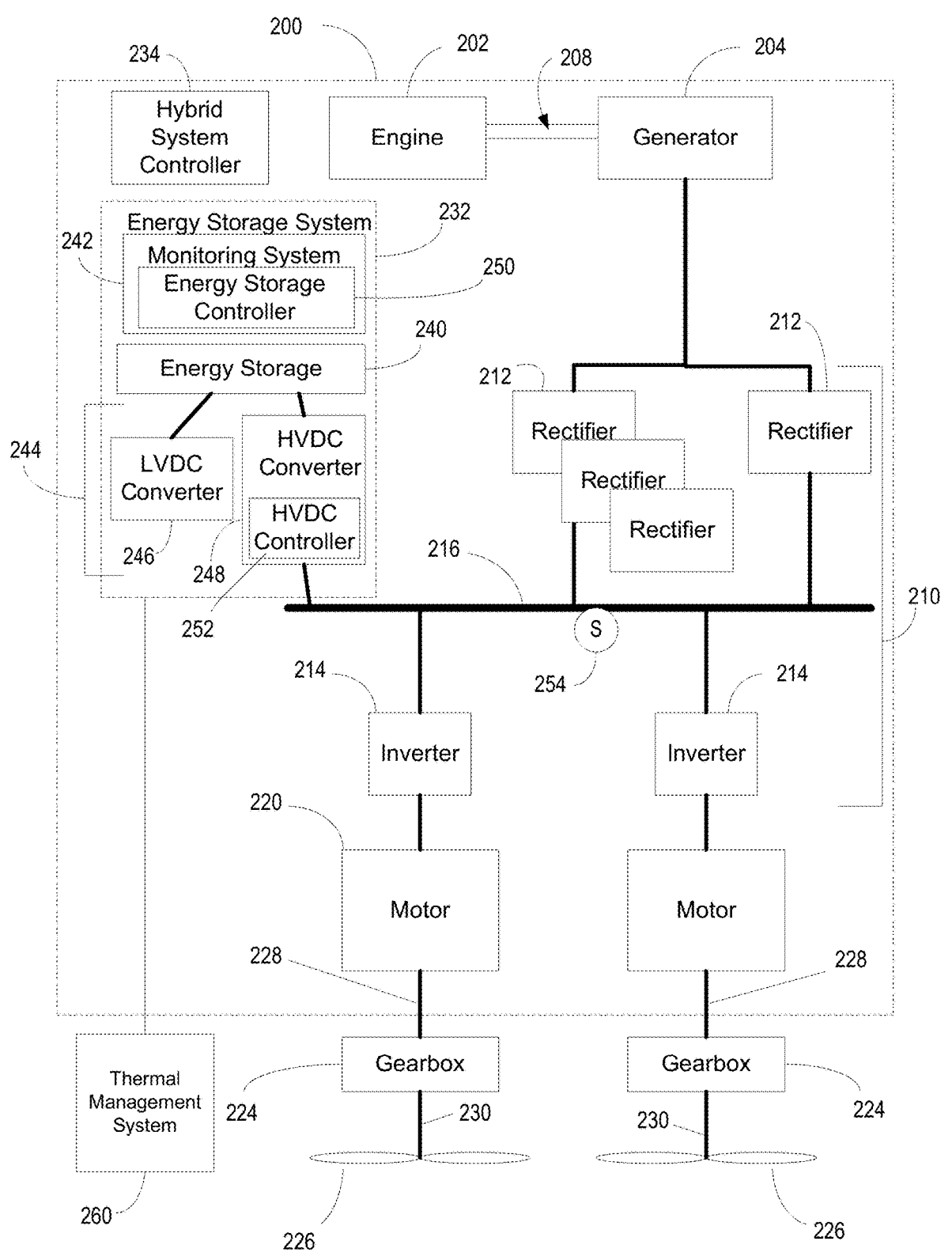
FIG. 2 is a block diagram example of thermal management system in a electric propulsion system for an aircraft.

FIG. 2 is a block diagram example of a thermal management system 260 in an electric propulsion system 200 for an aircraft. The electric propulsion system 200 of this example is a hybrid electric system that includes any number of electric generators 204 rotatably coupled with a respective one or more gas turbine engines 202 to form one or more turbogenerators. In other examples, diesel engine(s), fuel cell(s), or other form of engine(s) may be used as a prime mover(s) in addition to, or as an alternative to, the gas turbine engine(s) 202. In still other examples, the thermal management system 260 may be used in a fully electric application without the hybrid aspect. In FIG. 2, the electric propulsion system 200 may be configured as a variable load supplied rotational energy by the gas turbine engine 202. In the context of a hybrid electric system, the gas turbine engine 202 may be supplied fuel by a fuel system at a variable flow rate to vary the rotational torque output of the gas turbine engine 202. The gas turbine engine 202 may include a power takeoff that spins a rotational shaft 208 mechanically coupled to the electric generator 204.

The generator 204 may be an asynchronous or synchronous machine capable of outputting electric power when rotated by the shaft 208. The electric power may be output as alternating current (AC) or direct current (DC) power feeding one or more electric energy adapters 210. In the illustrated example, the generator 204 is an AC generator feeding one or more electric energy adapters 210. The electric energy adapter(s) 210 may include one or more rectifiers 212, one or more inverters 214, and/or other energy adapter devices or systems, such as converters, transformers, filters, and the like. The rectifiers 212 may be AC to DC rectifiers supplying rectified electric power output from the generator 204 to one or more aircraft engine supply busses 216. Loads may be electrically coupled with the aircraft engine supply bus 216 and supplied the electric power output from the generator 204. A voltage of the electric power on the aircraft engine supply bus 216 may be stepped up, stepped down, or converted, such as from DC to AC prior to being supplied to the loads. In the example of FIG. 2, the aircraft engine supply bus supplies inverters 214. The inverters 214 may convert the DC power to AC power and supply the AC power to one or more propulsor motors 220.

The propulsor motors 220 may be energized by the voltage present on the aircraft engine supply bus 216 to rotate gearbox 224, which in turn may rotate a propulsor 226, such as an airplane propeller or a helicopter rotor, which can provide lift and/or thrust to the aircraft. The propulsor motors 220 may include one or more induction or synchronous motors operable to rotate an output shaft 228 when energized with a variable rotational torque. The output shaft 228 may be mechanically coupled with the gear box 224. The gear box 224 may operate as a transmission system between the propulsor motors 220 and the propulsor 226 to change the rotational speed of the output shaft 228 of the propulsor motor 220 and supply rotational torque on a propulsor shaft 230 rotating the propulsors 226.

In addition to the rectifiers 210 supplying power to the aircraft engine supply bus 216, an energy storage system (ESS) 232 may also supply either AC or DC power to the aircraft engine supply bus 216. In examples where the electric propulsion system 200 is a hybrid system for the aircraft or other vehicle, the system may also include a hybrid system controller (HSC) 234. The hybrid system controller 234 may include circuitry configured to perform at least some of the functions described herein. The hybrid system controller 234 may, for example, include a non-transitory memory with instructions stored therein that are executable by the hybrid system controller 234. The hybrid system controller 234 may include one or more processors executing logic based on the stored instructions.

During operation, the hybrid system controller 234 may perform power balancing and manage/govern other controllers within the hybrid electric system and/or perform the functionality, or cause to be performed, the functionality described herein. In addition, the hybrid system controller 234 may manage and control the energy storage system 232. Further, the hybrid system controller 234 may control aspects of operation of the gas turbine engine 202.

An example gas turbine engine 202 used in a hybrid aircraft, such as a Rolls Royce M250 engine, may include an engine controller, such as a full authority digital control system (FADEC) (not shown). The hybrid system controller 234 may manage and control the energy storage system 232 in accordance with control signals received from the FADEC. In other examples, the functionality of the FADEC and the hybrid system controller may be resident in the same controller or a series of controllers.

The energy storage system (ESS) 232 may include, for example, one or more energy storage device 240, such as batteries, an energy storage monitoring system 242, such as a battery monitoring system (BMS), and power electronic converters 244, such as, a Low Voltage DC:DC Converter 246 (LVDC Converter) and a High Voltage DC:DC Converter 248 (HVDC Converter). The Low Voltage DC:DC Converter 246 (LVDC Converter) and/or the High Voltage DC:DC Converter 248 (HVDC Converter) may be electrically connected with the energy storage device 240 and the aircraft engine supply bus 216. The energy storage monitoring system 242 may include energy storage controller circuitry 250, which may include a processor executing instructions stored in memory to provide at least the functionality described herein. The system 232 may also include a High Voltage Control Circuitry 252 (HVDC controller circuitry) configured to control the HVDC converter 248 using, for example, a processor executing instructions stored in memory. The ESS 232 may use a thermal management conditioning system 260 for managing the temperature of components such as the energy storage device 240, the LVDC Converter 246 and the HVDC converter 248 due to significant variations in temperature, such as cold temperatures at high altitude operation with little power draw from the ESS (minimal internal heating) and high temperatures such as an aircraft leaving a hot runway, heat soaked, with the ESS 232 ramping output power to maximum output. An example temperature range is from −40° C. to +55° C. ambient, where energy storage devices, such as batteries, may reach 90° C. before possible failure or damage. Components, such as the energy storage devices 240 may need cooling or heating. In hybrid system examples where the ESS 232 may be part of the electric propulsion system 200 that also includes the Hybrid System Controller (HSC) 234, multiple loads and power sources may be present where the HSC 234 is responsible for power balancing and governing controllers distributed within the system.

The Energy Storage System (ESS) 232 may be either a load or a source on the aircraft engine supply bus 216 according to operating conditions. The electric generator 204 may be rotational driven with the gas turbine engine 202 as a turbogenerator to output electric power, which may be supplied to the one or more propulsor motors 220 via the aircraft engine supply bus 216. The energy storage device 240 may also supply electric power to the aircraft engine supply bus 216. The energy storage device 240 may be a battery, a capacitor, or any other device or system capable of storing and discharging electrical energy. The electric energy adapters 210 may adjust a voltage level and/or provide conversion of electric power between alternating current (AC) and direct current (DC).

In the example of FIG. 2, the electric energy adapters 210 include rectifiers 212 and inverters 214. The rectifiers 212 may rectify AC power received from the electric generator 204 to provide DC power to the aircraft engine supply bus 216. The inverter 214 may invert DC power received from the aircraft engine supply bus 216 to provide AC power to the propulsor motors 220. In other examples, other configurations of AC and DC power may be used, or only AC, or only DC power may be used. In the illustrated example, when the ESS 232 is supplying power, the HVDC converter 248 may convert a voltage level of DC power received from the energy storage device 240 to a different voltage level of DC power present on the aircraft engine supply bus 216. The generator 304, the ESS 232 and/or the electric energy adapters 210 may receive control communications directly or indirectly from the hybrid system controller 234.

The hybrid system controller 234 may indirectly control the generator 204, the ESS 232 and the electric energy adapters 210 via local controllers in communication with the hybrid system controller 234. The generator 204, the ESS 232 and electric energy adapters 210 may include, or be in communication with, a respective local control that provides the operational functionality of the respective system or device. For example, the generator 204 may include a local generator control configured to control the electrical characteristics and operation of the generator 204, such as the power factor angle, excitation voltage, and/or watts produced. In examples, where the energy storage device 240 is a battery, the energy storage controller circuitry 250 included in the monitoring system 242 associated with the energy storage device 240 may include the functionality to enable selective charge and discharge of the battery in accordance with predetermined operational parameters, such as charge and discharge limits. In examples, the rectifiers 212 may include a local rectifier controller circuitry configured to control active rectification switching of the rectifier 212 from AC to DC power. In examples, the inverters 214 may include a local inverter controller circuitry configured to control active conversion switching of DC power from the aircraft engine supply bus 216 to AC power to drive the propulsor motors 220.

In addition, the DC voltage and current output to the aircraft engine supply bus 216 via the HVDC converter 248 may be controlled and regulated by the HVDC controller circuitry 252. In that regard, power sensors 254, such as voltage and current sensors may monitor the aircraft engine supply bus 216 and provide dynamic sensor signals to the HVDC controller circuitry 252 to enable this control. Although illustrated in FIG. 3 as separate devices, the LVDC converter 246 and the HVDC converter 248 may be included in a common converter providing low voltage and high voltage conversion. In an example, the LVDC converter 246 may convert the energy storage device 240 output voltage to a relatively low voltage such as 28 VDC, whereas the HVDC converter 248 may output a relatively high voltage such as above 1000 VDC During operation, the ESS 232 may dynamically supply or receive power from the aircraft engine supply bus 216 according to the bus voltage of the aircraft engine supply bus 216. As load on the aircraft engine supply bus 216 increases faster than or beyond what the generator 204 can supply, the energy storage devices 240 may supply current via the HVDC converter 248, for example, to the aircraft engine supply bus 216 to avoid the bus voltage dropping. If, on the other hand, load on the aircraft engine supply bus 216 decreases faster than the generator 204 can respond, the energy storage devices 240 may be supplied current from the aircraft engine supply bus 216 via the HVDC converter 248 to avoid the bus voltage increasing.

In another example, total power demand required from the aircraft engine supply bus 216 is greater than the turbogenerator 204 can continuously supply, causing the ESS 232 to discharge. (This case may generate the most heat generation in the energy storage devices 240, such as batteries, especially in the extreme when the turbogenerator 204 cannot supply power and all propulsive power is provided by the ESS 232—this may represent an emergency case for hybrid systems, and normal operation for all-electric systems. In still another example, regenerative power is provided by the inverters 214 and/or the rectifiers 212 such that total power demand is negative on the aircraft engine supply bus 216, causing the ESS 232 to charge the energy storage devices 240.

As the ESS 232 is supplying power and receiving power from the aircraft engine supply bus 216, the temperature of the components of ESS 232 may increase or decrease beyond desired temperature ranges. The ESS 232 may include multiple operating modes within the hybrid aircraft that influence the amount of cooling or heating the ESS 232 needs at certain stages of operation. For example, the ESS 232 may include the operating modes of:

1. High Aircraft Power Losses—Energy storage device 240 delivering maximum emergency power to the aircraft engine supply bus 216 due to high power demand.

2. Medium Aircraft Power Losses—Energy storage device 240 delivering power to the aircraft engine supply bus 216 in response to power demand being within predetermined projected range of power output, such as providing hybrid aircraft take-off assist power.

3. Low Aircraft Power Losses—Energy storage device 240 not delivering or receiving power from aircraft engine supply bus 214—no or negligible power demand. Under this operating mode, LVDC converter 246 may still be delivering power supplied via the HVDC Converter 248 from the aircraft engine supply bus 214, albeit at low power losses. During these operating modes, components of the ESS 232, such as the energy storage device 240, may be operated within their allowable or desirable temperature limits. This may be achieved using the thermal management system 260.

Figure 3:
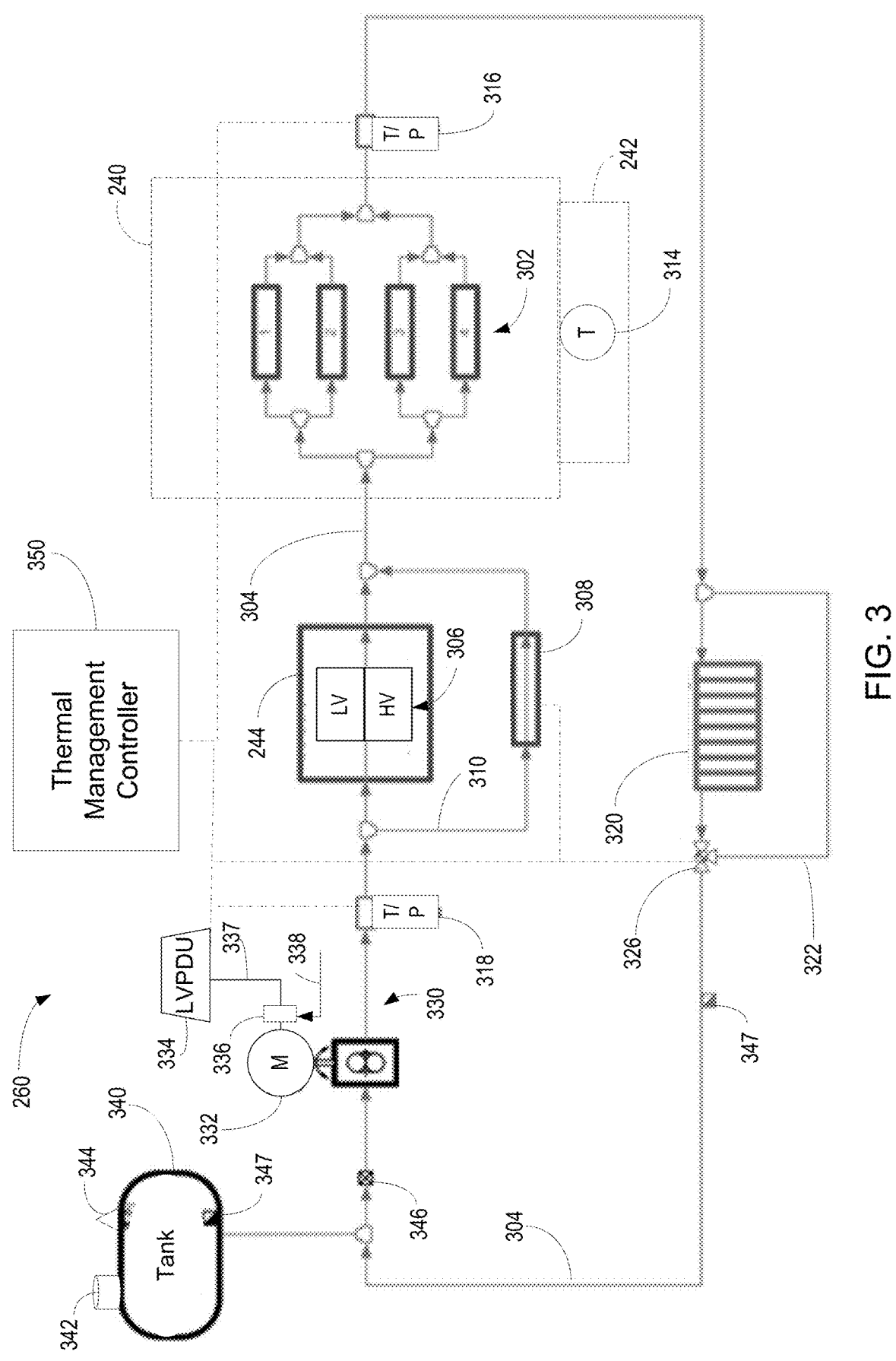
FIG. 3 is block diagram of an example thermal management system for an electric propulsion system.

FIG. 3 is a block diagram of an example of the thermal management system 260 for an electric propulsion system. The thermal management system 260, may be used to regulate, for example, the temperature of the energy storage device 240 in the electric propulsion system 200 as discussed with reference to FIG. 2. In the illustrated example, temperature conditioning of the energy storage device 240 may be performed with heat transfer hardware 302, such as flow plates, which may be contiguously positioned on the energy storage device 240 to absorb heat generated by the energy storage device 240 or dissipate heat to the energy storage device 240.

As illustrated in the example of FIG. 3, the heat transfer hardware 302 may be coupled in parallel by fluid lines 304 in which a thermal management fluid, such as a liquid or a gas may be circulated. In FIG. 3, four flow plates 302 are illustrated, however, in other examples, fewer or greater numbers may be present. In addition, in other examples other forms of liquid based heat absorption and conduction hardware may be used, such as conductive or immersive liquid cooling/heating hardware in the form of, for example, heat sinks, cooling matrices, cooling fins, and the like. Control of the temperature of the energy storage device 240 by the monitoring system 242 may be based on one or multiple temperature sensors 314 mounted on, in, or proximate the energy storage device 240, such as, in the case of batteries, temperature sensors may be mounted directly on, or embedded in, the batteries to monitor battery cell surface temperature. In addition, one or more sensors 316, such as a pressure or temperature sensor in the fluid line 304 downstream of the energy storage device 240 and sensing at least one of pressure or temperature of the thermal management fluid in the energy storage device 240 may be implemented.

The power electronic converter 244, such as the LVDC and HVDC converters 246 and 248 (FIG. 2), may also include heat transfer hardware 306 capable of heating or cooling. In FIG. 3, the power electronic converter 244 may include functionality of both LVDC and HVDC converters 246 and 248, which are subject to a common stream of thermal management fluid supplied to thermal transfer hardware 306, such as respective HV and LV flow plates, via the fluid line 304. An in-line heater 308 may provide additional heating of thermal management fluid present in the bypass fluid line 310 when the amount of heat energy transferred to the thermal management fluid from the power electronic converter 244 is insufficient to meet the heating needs of the energy storage device 240. The in-line heater 308 may be, for example, an electric powered resistive heating element. In other examples, the bypass in-line heater 308 may provide heating based on another heat source, such as the gas turbine engine 202, the generator 204, and/or any other type of prime mover or heat source present in a hybrid system. The bypass in-line heater 308 may heat the thermal management fluid in the bypass line 310 based on one or more sensors 318, such as a pressure and/or temperature sensor, upstream of the power electronic converter 244 and the bypass in-line heater 308.

The discussion of the thermal management system 260 may refer to a "battery," as the energy storage device 240 for illustrative purposes, however, the energy storage device 240 is not limited to batteries. Moreover, other components in the ESS 232 (FIG. 2) may be heated or cooled with the thermal management system 260 in addition to or instead of the energy storage device 240. In the event the battery 240 needs to be cooled to keep it within its allowable operating temperature range, the thermal management fluid extracts heat from the battery 240 and then the heat is removed from the fluid using a heat exchanger 320. In the example shown this is achieved with an airframe mounted air-cooled heat exchanger 320. In other examples, other forms of heat exchanger may be used, such as a shell and tube heat exchanger, plate heat exchanger, plate and shell heat exchanger, adiabatic wheel heat exchanger, plate fin heat exchanger, finned tube heat exchanger, pillow plate heat exchanger, and the like. The heat exchanger 320 may include a bypass line 322 controlled by a temperature bypass valve 326 to divert the thermal management fluid around the heat exchanger 320 when temperature regulation of cooling or heating of the thermal management fluid with the heat exchanger 320 is not needed.

During operation, in the event that the battery 240 needs heating to keep within an allowable operating temperature range, the heat exchanger 320 may be bypassed and the thermal management fluid flowing via the fluid lines 304 to the battery 240 may be heated with the power electric converter 244 and/or the in-line heater 308.

A pump 330 is included to circulate the thermal management fluid around a thermal management conditioning loop formed with the fluid lines 304 to transfer fluid between a tank 340, the in-line heater 308/power electronic converter 244, the heat exchanger 320 and the components to be temperature conditioned, such as the battery 240. The tank 340 may be, for example, an expansion tank that includes a fill port 342 to receive the thermal management fluid, and a pressure relief valve 344 to automatically relieve pressure within the tank 340 when the tank internal pressure goes above a predetermined pressure threshold. Alternatively pump speed of the pump 330 may be used to regulate pressure and/or the pressure relief valve may be omitted. The tank 340 may also include a level indication, such as a sight glass or level sensor. In addition, filters, drains, pressure regulators, check valves, and the like may be included in or around the tank 340. In the illustrated example, a drain 346 is shown in the fluid lines 304 upstream of the tank 340 and in the tank 340 to allow extraction of the thermal management fluid, such as for maintenance, and a filter 347 of the tank 340, such as a mechanical screen may be included in the fluid lines 304 downstream of the tank 340 to remove particulate and/or debris.

The pump 330 may be any electric pump having an electric motor 332 that is controlled by control signals provided by a low voltage power distribution unit (LVPDU) 334. The pump 330 may be any form of pump capable of pumping the thermal management fluid through the fluid lines 304. The pump 330 may be selectively energized by a pump controller 336 that includes a switch, such as an electric contactor, a circuit breaker, or some other switching device capable of being selectively electrically actuated to supply low voltage DC power (LVPDU pump power) to the motor 332. The LVPDU 334 may control the pump controller 336 with control signals on pump control signal lines 337. In addition to receiving control signals, the pump controller 336 may be supplied low voltage DC power (LVPDU pump power) from the LVDC converter 246 (FIG. 2) on an LVPDU pump power line 338 to power the pump 330. Thus, the pump 330 may be selectively powered by the energy storage device 240 and/or the high voltage aircraft engine supply bus 216. The pump motor 332 may be a variable speed motor responsive to changes in voltage to adjust the pumped volume or throughput or capacity of the thermal management fluid through the pump 330.

Thermal management controller circuitry 350 may control activation and deactivation of the pump 330 via the LVPDU 334. In addition, thermal management controller circuitry 350 may perform other operations and functionality of the thermal management system 260 as described herein. In an example implementation, the thermal management controller circuitry 350 may include a processor and memory executing instructions to perform the functionality described herein via an input/output interface. Alternatively, or in addition, at least a portion of the functionality of the thermal management controller circuitry 350 may be included in the energy storage controller circuitry 250 of the ESS 232. Alternatively, or in addition, at least a portion of the functionality of the thermal management controller circuitry 350 may be included in the HVDC controller circuitry 252. Alternatively, or in addition, at least a portion of the functionality of the thermal management controller circuitry 350 may be included in the hybrid system controller 234.

During example operation, the thermal management controller circuitry 350 may control sequencing of the pump 330, used to circulate the thermal management fluid, to cooperatively operate with the in-line heater 308. Cooperative operation of the pump 330 in connection with in-line heater 308 may include the following functionality implemented with the thermal management controller circuitry 350.

1. Confirmation that the pump 330 is operational before the in-line heater 308 is energized to avoid the risk of localized overheating and/or lack of heat reaching the battery 240.
2. If the variability of the pumping capability of the pump 330 is not controlled, i.e. the pump 330 is fixed speed operation, then the pumping flow of the pump 330 may be set to a predetermined pump flow, such as a maximum pump flow, to accommodate worst case thermal conditioning needs of the ESS 232. The thermal management controller circuitry 350 may control the ESS 232 to avoid inefficient operation under other thermal conditions which may occur during the previously discussed operating modes of the ESS 232.
3. The pumping capability of the pump 330 may include a degree of control of the pump speed by the thermal management controller circuitry 350, which may be, for example:
   a. Full variable pump speed control, such as using a PID controller; and/or
   b. Fixed discretized speed settings, such as off, low, medium and high.
4. In the event the thermal management controller circuitry 350 controls the variability of the pumping capacity of the pump, such as using pump speed control, the thermal management controller circuitry 350 may also control/manage, for example:
   a. Startup of the pump 330 such that the pump 330 is started at a predetermined initial pumping set point, such as when the thermal management system 260 is initially powered up.
   b. Confirmation of startup/operability of the thermal management conditioning loop ahead of the thermal management controller circuitry 350 entering an active control mode.
   c. Dynamic control of the speed/volume of the pump 330 using a feedback control loop and/or feed forward control loop based on, for example, sensor signals, fault conditions, power demand and the like.
   d. Confirmation that the pump 330 is operational.
   e. Management of failure modes of pump control and management of the effect of the pump control failure modes on the energy storage system 232 (FIG. 2).

f. Management of impact of failure conditions within the thermal management system 260 and/or the energy storage system 232 that are not associated with the pump control.

Figure 4:
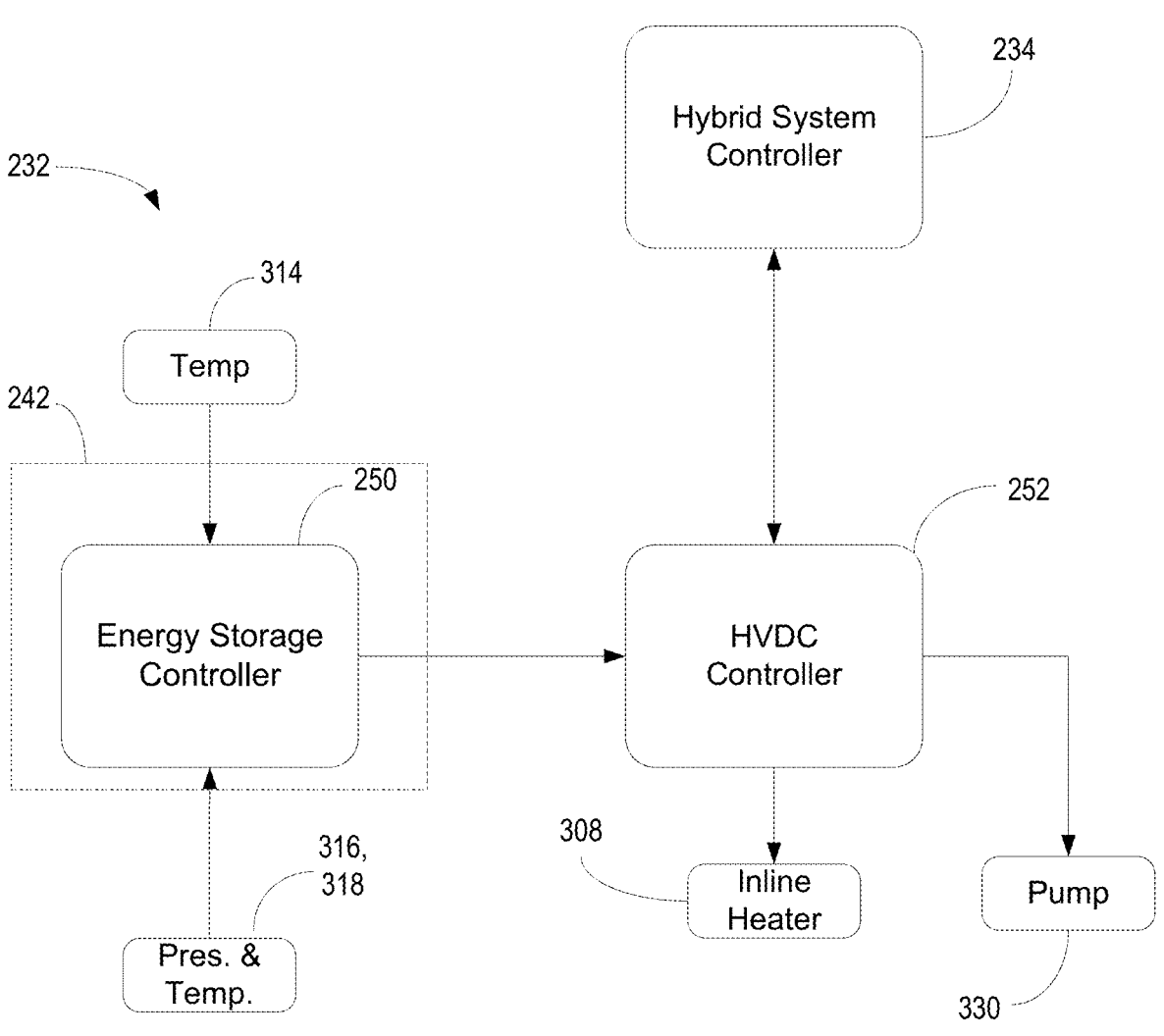
FIG. 4 illustrates an example operational configuration of controller circuitry in an example hybrid electric system.

FIG. 4 illustrates an example operational configuration of controller circuitry in an electric propulsion system 200. In this example operational configuration, communication interfaces between the various controller circuitry and select other components of the electric propulsion system 200 are illustrated. In the illustrated example, the thermal management controller circuitry 350 (FIG. 3) is omitted, and the control and functionality of the ESS 232 is distributed among other controller circuitry in the system. In other example configurations, the functionality of the controller circuitry may be differently distributed and/or the hybrid system controller 234 may be omitted. In addition, in other examples, different, additional, or fewer communication interfaces may be implemented to accomplish the functionality described herein.

In FIG. 4, the monitoring system 242 of the ESS 232 may include energy storage controller circuitry 250 to receive sensor signals representing temperature from the sensors 314 monitoring battery cell surface or internal temperatures. In addition, the energy storage controller circuitry 250 may receive information directly from sensors 316 and 318, which measure fluid pressures and temperatures in the fluid lines 304 (FIG. 3) at the inlet and outlet of the ESS 232. Further, the monitoring system 242 may receive other temperatures, such as the temperature of the in-line heater 310, the HVDC converter 248 and the LVDC converter 246 illustrated in FIG. 3.

Referring to FIGS. 2 and 4, in this example the control circuitry of the pump 330 (e.g. LVPDU 334 and pump controller 336) may be implemented within the HVDC Converter 248. The HVDC Converter 248 of this example may also house the HVDC—High Voltage Controller circuitry 252. The HVDC controller circuitry 252, among other things, may be responsible for sending commands to control the thermal management coolant pump 330. For example, the HVDC controller circuitry 252 may provide a pulse-width-modulated (PWM) control signal to the pump 330 for dynamic speed control.

In the illustrated example, the hybrid system controller 234 may direct the HVDC controller circuitry 252. Accordingly, in this example, it is the hybrid system controller 234 that may control coordinated operation of the pump 330 with the inline heater 308. Coordinated operation may include management of the batteries 240 within a desired predetermined temperature range within the aircraft in accordance with bits/commands provided by the energy storage controller circuitry 250 and the HVDC controller circuitry 252. For example, in the case of a hybrid system, the energization of the in-line heater 308 may only be enabled by a request from the energy storage controller circuitry 250 after confirmation of a safe operation indication of the electric propulsion system 200 via the hybrid system controller circuitry 234, and confirmation of safe operation of the HVDC converter 248 via the HVDC Controller circuitry 252. The in-line heater 308 may be deenergized by a request from the energy storage controller circuitry 250, or the hybrid system controller circuitry 234, or the HVDC controller circuitry 252.

Operation of the pump 330 may be implemented with a combination of computer logic and hardware logic to ensure safe and reliable operation under various operating conditions and failure modes within the aircraft. Additional levels of safety within the aircraft and the thermal management system 260 may be provided by:

1. Over pressurization avoidance—Preventing over-pressurization of the thermal management system 260 at low temperatures by ensuring the pump 330 starts at a predetermined low speed that is less than rated or maximum speed;

2. Fail on Pump—Ensuring default operation of the pump 330 is energized to operate at a constant voltage override and pumping at a predetermined speed and/or pumping capacity of the pump, such as a maximum speed and/or pumping capacity, rather than turning off the pump 330 if a failure condition related to control of variable operation of the pump 330 occurs.

3. Overtemperature avoidance—The operational logic of the in-line heater 308 may be configured such that the in-line heater 308 may only operate if the pump 330 is enabled and operating.

4. Communication Integrity—The heater logic may be configured such that the in-line heater 308 can only operate to heat the thermal management fluid if the hybrid system controller circuitry 234, the energy storage controller circuitry 250 and the HVDC controller circuitry 252 have communication and are in agreement.

5. Override Capability—The pump 230 may be deenergized by a request from the energy storage controller circuitry 250, or the hybrid system controller circuitry 234, or the HVDC controller circuitry 252. For example, the hybrid system controller 234 may have the authority to disable powering the pump 330 via the HVDC controller circuitry 252.

Figure 5:
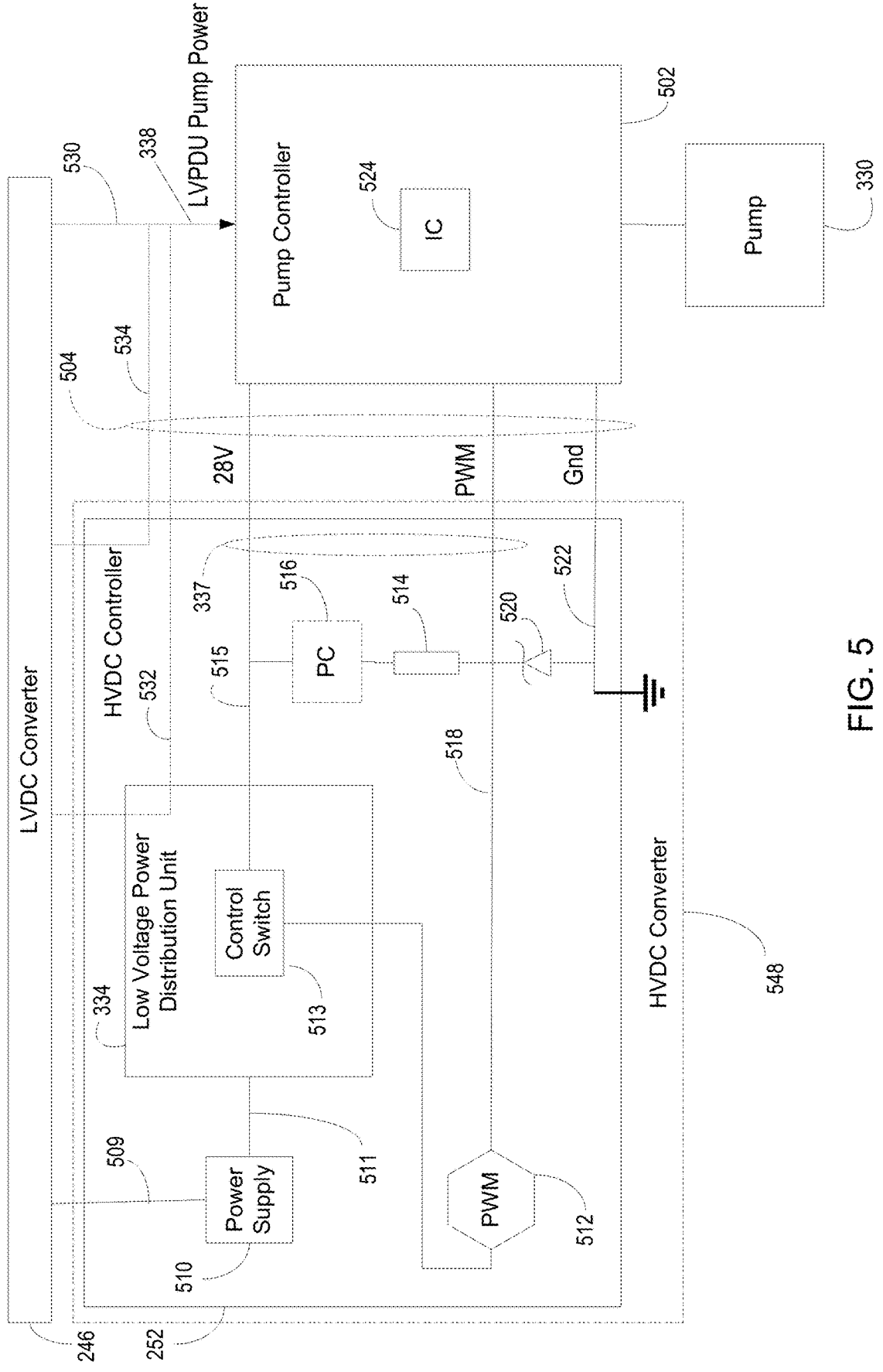
FIG. 5 is a block diagram schematic showing an example of the interface of the HVDC controller circuitry and a low voltage power distribution unit.

FIG. 5 is a block diagram schematic showing an example of the interface of the HVDC controller circuitry 252, a low voltage power distribution unit (LVPDU) 334 and a pump controller 502 for the pump 230. In FIG. 5 an example arrangement for fail high operation of the pump 330 is provided. The pump controller 502 may be supplied LVPDU pump power for the pump 330 via the LVPDU pump power line 338 illustrated in FIG. 3. A pump wiring harness 504 may be coupled between the HVDC converter 248 and the LVPDU 334. The LVDC converter 246 may supply power to a power supply 510 on a PS power supply line 509. The power supply 510 may output as pump control supply power on a pump control power line 511 a predetermined constant DC voltage, such as 28 VDC. Alternatively, the LVDC converter 246 may supply control power to the LVPDU 334 absent the power supply 510. Thus, the control power on the pump control power line 511 may be supplied from the LVDC converter 246 using the high voltage aircraft engine supply bus 21 and/or the energy storage device 240 (FIG. 2).

In addition, the HVDC controller circuitry 252 may include a pulse width modulator (PWM) 512, and the LVPDU 334 may include a control switch 513. The control switch 513 may provide on/off control of supply of a constant voltage override control signal on a constant voltage override control signal line 515 and a PWM control signal output by the PWM 512 on a PWM output line 515. Alternatively, the control switch 513 may provide on/off control of supply of the constant voltage override control signal on the constant voltage override control signal line 515 and on/off control of the PWM control signal may be omitted. The constant voltage override control signal line 515 and the PWM output line 518 may be included in the pump control signals line 337. The control switch 513 may be controlled by logic of the energy storage controller circuitry 250, or the hybrid system controller circuitry 234, or the HVDC controller circuitry 252 as discussed with reference to FIG. 4. In other examples, the LVPDU 334 may include LVPDU controller circuitry with switching functionality that is in communication with the energy storage controller circuitry 250, the hybrid system controller circuitry 234, and/or the HVDC controller circuitry 252 (FIG. 4).

Referring to FIGS. 2-5, the PWM 512 may be powered by the HVDC converter 252 via the power supply 510. In examples, the switch 513 of the LVPDU 334 may also control on/off supply of power to the PWM 512. When powered, the PWM 512 may be dynamically controlled by the thermal management system controller 350, such as the HVDC controller circuitry 252. In an example, the HVDC controller circuitry 252 may receive supply power for the PWM 512 from the LVDC converter 246. The HVDC controller 252 may, for example, be directed to output a PWM control signal as a control signal to dynamically and variably energize the pump 330. In addition, in other examples, the LVDC converter 246 may have a low voltage controller circuitry providing at least some of the described functionality. The power supply 510 may be supplied by the LVDC converter 246 on the PS supply line 509. A pull up resistor 514 may be coupled between the constant voltage override control signal line 515 and the PWM output line 518 of the PWM 512 inside, for example, the enclosure of the HVDC converter 248. In addition, a switch 520, such as a diode, may be coupled between the PWM output line 518 and a ground line 522.

During operation, in the event of loss of the PWM control signal output by the PWM 512, the pump control signal controlling the pump 330 may default to the constant voltage override control signal. The constant voltage override control signal may be the output voltage of the power supply 510, such as 28 VDC. In examples, where there is a difference in control voltage between the constant voltage override control signal on the pump control signal line 337 and the PWM output line 518, a power converter 516 may be used to step up or step down the voltage of the constant voltage override control signal. For example, where the constant voltage override control signal output of the LVPDU 234 is 28V, and the PWM control signal output of the PWM 512 is 0-10V, the power converter 516 may step down the constant voltage override control signal by a predetermined ratio to provide 10V. The default output control voltage of the LVPDU 234 is the constant voltage override control signal, which automatically takes control of the pump 230 when the PWM signal 512 is absent. In this example implementation, the PWM control signal generated via the HVDC controller 252 to the pump controller 502 may be inverted by a PWM IC (integrated circuit) 524 in the pump controller 502 that delivers the inverted PWM as the input control signal to control LVPDU pump power on the pump power line 338 being selectively supplied to the pump 330. The PWM signal from the HVDC controller circuitry 252 to the PWM IC 524 on the PWM output line 518 may be isolated. In addition, the constant voltage override control signal output by the power supply 510 for the pump 330 and the PWM control signal variably controlling power to the pump 330 may be from two independent sources. Accordingly, if the PWM control signal from the PWM 512 fails (PWM signal lost), the pump controller 502 receives the constant voltage override control signal and the pump defaults to a predetermined pumping capacity, such as maximum rated speed of the pump 330, instead of being commanded or defaulting to zero or minimum speed.

In this example, the pump 330 may have a dedicated low voltage (LV) power distribution unit (PDU) channel to provide the LVPDU power on a first LVPDU power line 530 from the LVDC converter 246. In another example, for simplification of harnessing (single wiring harness 504 to the pump controller 502 from HVDC converter 246 with Gnd, PWM 28V, and LVPDU pump power), the LV PDU pump power may be passed via the HVDC converter 248 and the LVPDU 334 to the pump controller 502 on a second LVPDU power line 532. In another example the LV PDU pump power may be supplied from the LVDC converter 246 via the HVDC converter 248 to the pump controller 502 on a third LVPDU power line 534, without passing through the LVPDU 334, but which may still be included in the wiring harness 504. In other examples, at least one of the pump control signal line 337 or the PWM output line 518 or the ground line 522 may be coupled between the LVDC converter 246 and the LVPDU 334 such that the first LVPDU power line 530 may be a harness between the LVDC converter 246 and the pump controller 502 containing Gnd, PWM and/or 28V, and LVPDU pump power. In some example configurations, the hybrid system controller (HSC) 234 may have authority to enable/disable the LV PDU power channel powering the pump 330 by communication with the HVDC controller 248, or by direct control of the LVPDU 334, the pump controller 502 and/or the LVDC converter 246.

Figure 6:
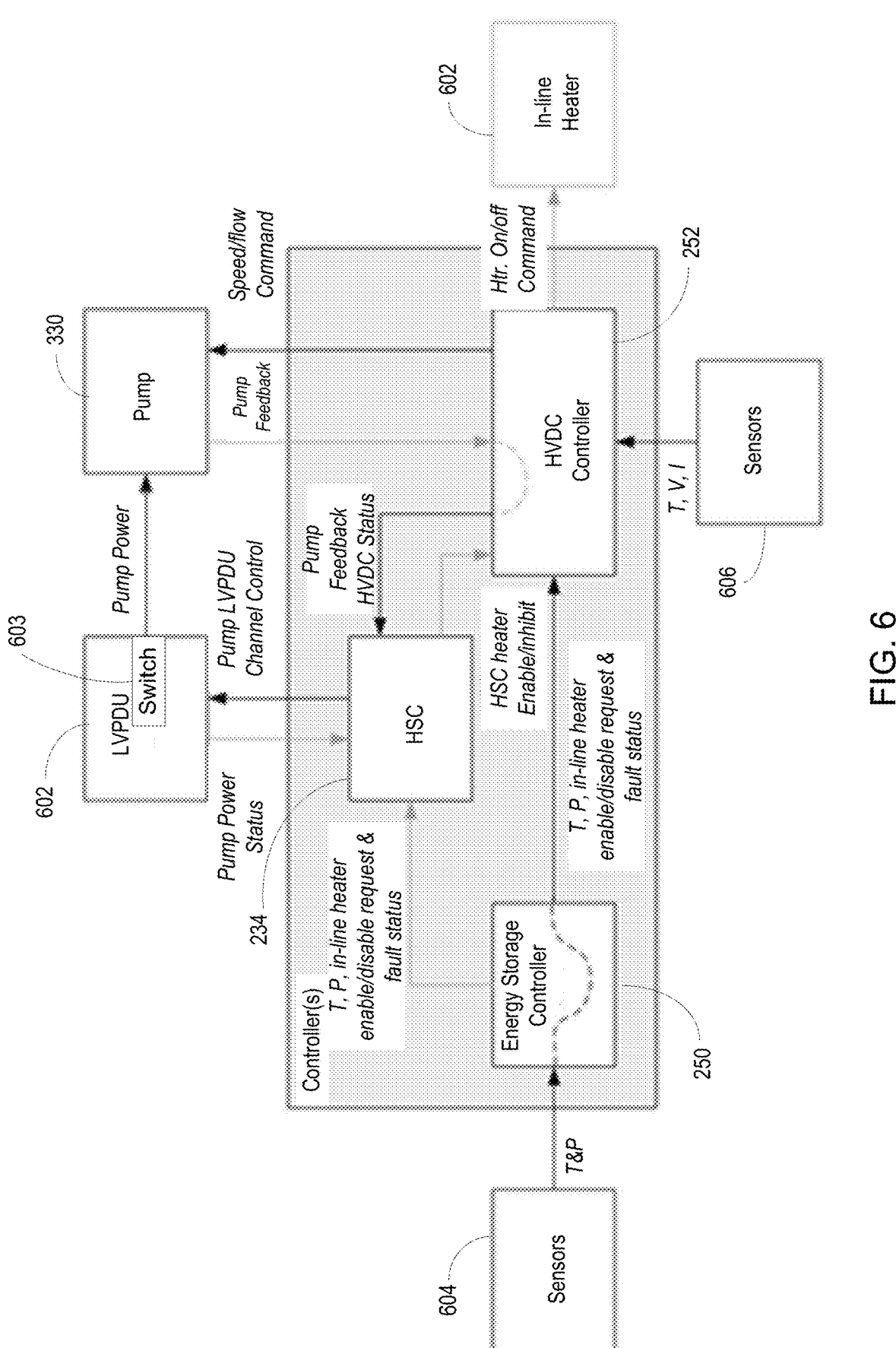
FIG. 6 is a block diagram illustrating example data flows/signals between the controllers and sensors/devices in an example electric propulsion system.

FIG. 6 is a block diagram illustrating example data flows/signals related to pump control between the controllers and sensors/devices of the thermal management system, such as, for example in a hybrid electric system. In other examples, the system may be fully electric (e.g. non-hybrid). Referring to FIGS. 2-6, in this example, a low voltage power distribution unit (LVPDU) 602, may include a switch/contactor 603 controlled by the hybrid system controller 234 to apply/remove low voltage LVPDU pump power for the pump 330. The sensors 604 may supply sensor signals to the energy storage controller circuitry 250 representing the pressure and temperature of the thermal management coolant, such as the sensors 316 and 318 at the inlet and outlet of the ESS 232, the temperature of the energy storage device 240, such as batteries, and/or other sensed temperature and/or pressure parameters in the system. The sensors 606, which may supply sensor signals to the HVDC controller 252 may include sensor signals representing the current and voltage measured on the high voltage aircraft engine supply bus 216 of the electric propulsion system 200, such as the sensors 254, and/or the temperature of the heat transfer hardware 306 of the LVDC/HVDC Converters 246/248.

In an example signal flow operation, the energy storage controller circuitry 250 may send a "heater enable" bit to the HVDC controller circuitry 252 when the monitoring system 242 is ready for the energy storage device 240, such as batteries, to be heated. The hybrid system controller 234 may monitor this communication from the energy storage controller 250 to the HVDC controller 252 and acquiesce by taking no contrary action. The hybrid system controller 234 may enable or inhibit heating by communication of a "HSC heater allow/inhibit" signal. The signal may be, for example, a bit that is set to allow/enable the HVDC controller 252 to proceed with heating when the hybrid system controller 234 is satisfied that the electric propulsion system 200 is configured appropriately to allow heating to commence. An example logic the hybrid system controller 234 may perform to be satisfied may be to check a fault status signal from the energy storage controller 250 to confirm that the pump 330 is operational and there are no other faults in the ESS 232.

In some cases, the signal communications of the controllers are optional pass through communications that may be performed when the functionality described herein is distributed differently among the illustrated controllers. For example, control of certain functionality may be split among multiple controllers, and/or any controller may receive or read raw data and pass the raw data, or resulting data or commands, on to another controller. In other examples, the controllers may communicate on a common communication bus, such as a universal serial bus (USB), PCI, SCSI, Aeronautical Inc. (ARINC)-429, MIL-STD-1553, ethernet, controller area network (CAN), or some other communication protocol by with the controllers may communicate.

Figure 7:
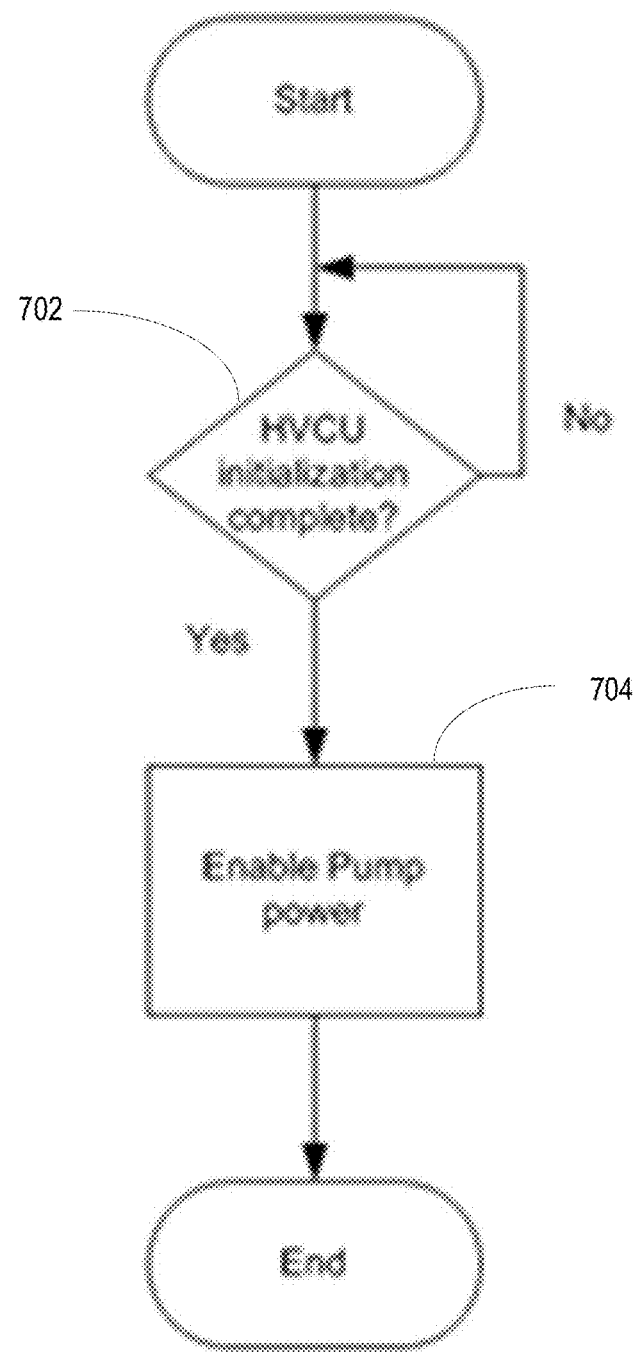
FIG. 7 is an example operational flow diagram for energization of the pump.

FIG. 7 is an example operational flow diagram for energization of the pump 330. The hybrid system controller 234 may perform the logic illustrated in FIG. 7 in order for the pump 330 to be powered. Referring to FIGS. 6 and 7, a default setting of the switch 603 in the LVPDU 602 may disable the LVPDU pump power such that upon startup of the hybrid system controller 234 and/or the LVPDU 602, the pump is disabled/deenergized. In FIG. 7, during initialization to startup the pump 230, the hybrid system controller circuitry 234 may determine whether initialization of the HVDC controller circuitry 252 has been completed. (702) The hybrid system controller circuitry 234 may check that the HVDC controller circuitry 252 initialization is complete before directing the LVPDU 602 to supply LVPDU pump power to enable startup of the pump 230. If the HVDC controller circuitry 252 initialization is not yet completed, the hybrid system controller circuitry 234 may continue checking for completion of initialization. If the hybrid system controller circuitry 234 did not delay powering of the pump 330 with the LVPDU pump power when the HVDC controller circuitry 252 is not yet initialized, the pump 330 may default to maximum speed/power when power is applied since the lack of initialization may be handled as a pump control fault condition. This is because control of the pump 230 is by design defaulted to operate the pump 330 at a predetermined pumping capacity, such as 100% pumping capacity, via the constant voltage override control signal on the constant voltage override control signal line 515, upon detected loss of pump control of the pump 330 via the PWM signal. Such default operation of the pump 330 may pose a risk at very low temps for over pressurization in the thermal management conditioning fluid circuit. If the HVDC controller circuitry 252 is initialized, the HVDC controller circuitry 252 is enabled by commands from the hybrid system controller 234 to control the output power to the pump 230 via the PWM signal to a predetermined safe pumping capacity that will not over pressurize, and the operation ends.

As discussed with reference to FIGS. 2 and 4, the HVDC controller circuitry 252 may be responsible for controlling the provision of the LVPDU pump output power to the pump 330. Multiple control options are available to the hybrid system controller 234 to direct the HVDC controller circuitry 252 to control the variable speed pump to service the various operating conditions. Some example control options in different scenarios include a first example scenario where the ESS 232 is delivering power from the energy storage device 240 to the aircraft engine supply bus 216 via the HVDC converter 248 to assist airframe take-off (such as, for example, approx. 60% ESS 232 maximum output power)—referred to as medium power demand. In a second scenario, the ESS 232 may be delivering power from the energy storage device 240 via the HVDC converter 248 to the aircraft engine power supply bus 216 during an emergency situation or condition referred to as high power, such as a situation in a hybrid system where the turbogeneration system has failed (gas turbine engine 202 and/or generator 204 malfunction) and the demand on the aircraft engine power supply bus 216 is high. (100% ESS 232 delivering maximum power). In a third scenario, referred to as low power, the energy storage device 240 may not be supplying power, however, the LVDC Converter 246 may be delivering power to the pump 330, or some other load using power from the aircraft engine power supply bus 216 being supplied to the LVDC Converter 246 via the HVDC Converter 248. In this scenario, there is no power demand, and the only power from the energy storage device 240 may be converter losses generating heat, for example.

Pump control by, for example, the HVDC controller circuitry 252 may include multiple options. In an example, pump speed may be the variable used by the hybrid system controller circuitry 234 to set the LVPDU pump power via the HVDC controller circuitry 252. Depending on the type of control, high and low power may be defined by setpoints, thresholds, and/or increasing/decreasing pressures or temperatures in the system. Control of the pump may be discretized such as selection between two or more discrete levels, or continuous such as by using a PID control. Example types of pump control include: full variable speed control where the pump speed may be varied in a predetermined range such as from 10% to 100% of rated speed. In another example, the pump control may have a predetermined number of speed settings, such as three settings. For example, 1) low speed (pump low output power) setting(s) for operational times such as when there are only converter losses extracting power from the energy storage device 240; 2) medium speed (pump medium output power) setting(s) for when the energy storage device 240 is supplying power to the aircraft engine supply bus 216, such as when the ESS 232 is supplying battery power assist during take-off (60% power); and 3) high speed (pump high output power) setting for emergency take-off power (100% power).

In other examples, other numbers of discrete settings are possible. For example, the HVDC controller circuitry 252 may provide two speed settings, such as a first discrete predetermined setting described as a Low speed operating mode (pump low output power) for any ESS 232 operation not including emergency power; and a second discrete predetermined setting described as a high speed (pump high output power) setting for emergency power only. In other examples, additional or fewer pump speed settings may be used. For a given hybrid electric system, pump speed settings may be determined and implemented by the HVDC controller circuitry 22 according to a combination of the ESS 232 operating mode, and thermal management conditioning temperatures and pressures of the thermal management fluid.

For example, low pumping speed or pumping capacity may be used when: fluid pressure is high (without failure conditions), ESS 232 output power demand on the aircraft engine supply bus 216 is low, and the thermal management fluid is within predetermined temperature and pressure limits (without failure conditions). In another example, medium speed pumping or pumping capacity may be used when the ESS 232 is experiencing medium power demand on the aircraft engine supply bus 216 (within normal operating range) and the thermal management fluid is within predetermined temperature and pressure ranges (without failure conditions). In still another example, high speed pumping may be used when temperature or pressure exceeds a predetermined threshold and the HVDC controller circuitry 252 cannot control the pump (failure conditions present). In this example, the fluid temperature may be high but the fluid pressure may be within a predetermined pressure limit. In addition, demand for the aircraft engine supply bus 216 may be high.

Figure 8:
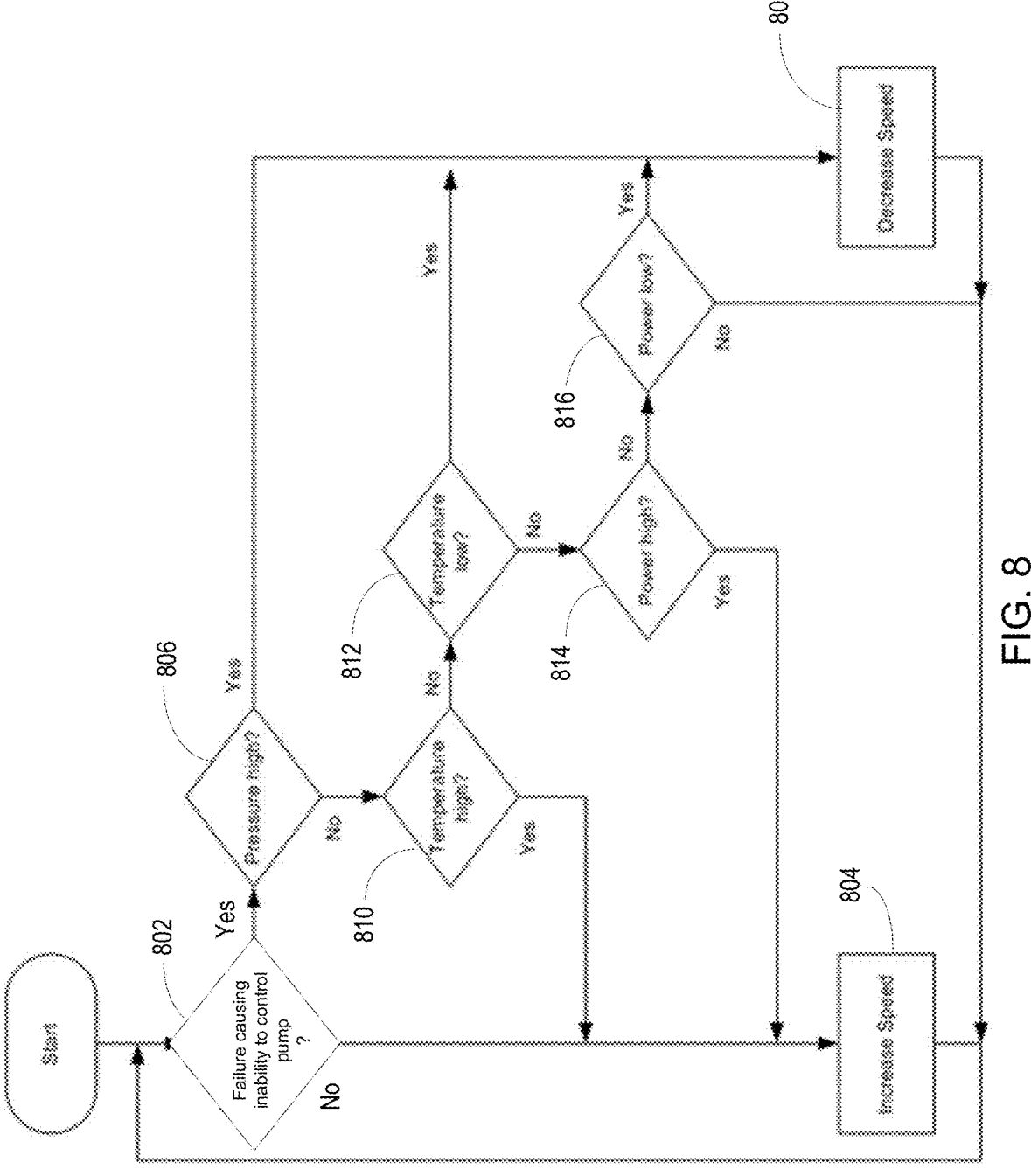
FIG. 8 is an example operational logic for pump speed (power) control in the thermal management system based on operating conditions of an example electric propulsion system.

FIG. 8 is an example operational logic for pump speed (power) control of the thermal management system 260 based on operating conditions of the electric propulsion system 200. FIG. 8 illustrates an example logic flow to determine in an example of a hybrid system whether the pump speed can be decreased or increased by, for example, the hybrid system controller circuitry 234 via the LVPDU 602. With reference to FIGS. 2-8, the operation starts with the hybrid system controller circuitry 234, the energy storage controller circuitry 250 and the HVDC controller circuitry 252 cooperatively operating to assess if there is a failure condition, malfunction, or operating condition that creates an inability for the hybrid system controller circuitry 234 to control the pump 230. (802) Such a determination may be based on, for example, fault indications, high or low sensor measurements and the like. If the system is fully functional and operational, the thermal management controller 350 may increase the speed of the pump 330, such as by adjusting the PWM signal, or changing to a higher speed setting. (804) After the thermal management controller 350 successfully changes the speed setting, the operation may return to again confirm there is no failure condition or malfunction. (802)

If, there is a possible failure condition or malfunction, the thermal management controller 350 may receive, via the energy storage controller circuitry 250, sensor signals from the sensors 316 and 318 at the inlet and outlet of the thermal management system 260. Based on the sensor signals, the thermal management controller 350 may determine if the pressure in the fluid lines 304 is above a predetermined threshold. (806) If yes, the thermal management controller 350 may decrease the speed of the pump 330 (808) and the operation may return to assessment of possible failure conditions. (802) If there is no high pressure detected, the thermal management controller 350 may determine if the temperature of the energy storage device 240 is above a predetermined temperature threshold based on a sensor signal received, via the HVDC controller circuitry 252 from the temperature sensor 314. (810) If yes, the thermal management controller 350 may increase the speed of the pump 330, such as by adjusting the PWM signal, or changing to a higher speed setting. (804) If low pressure occurs in the system, such as due to a leak, the temperature may rise, resulting in a high temperature condition detected by the sensors above the predetermined temperature threshold. In addition, or alternatively, a predetermined low pressure may be sensed to indicate conditions, such as a leak.

If the energy storage device 240 is not above a predetermined temperature threshold, the thermal management controller 350 may determine if the temperature of the energy storage device 240 is below a predetermined threshold temperature based on the sensor signals from the temperature sensor 314. (812) If the temperature is below the predetermined threshold, the thermal management controller 350 may decrease the speed of the pump 330 (808) and the operation may return to assessment of possible failure conditions. (802)

If the temperature is not below the predetermined threshold, the thermal management controller 350 may receive, via the HVDC controller circuitry 252, sensor signals from the bus sensors 254 on the aircraft engine supply bus 216 within a sensor feedback control loop, and determine if power being supplied by the aircraft engine supply bus 216 is above a predetermined threshold, such as delivering 100% emergency power. (814) Determination of high power output may be based on high current readings, low voltage readings, or a combination thereof. Alternatively, or in addition, in examples a feed forward signal, such as a demanded power signal may be used in a feed forward control loop instead of, or in addition to, sensor feedback control loop. In examples, the demanded power signal may be determined with the hybrid system controller 234 by, for example, power balancing logic and supplied/sent to the HVDC controller 252 as a command.

If the power output by the aircraft engine supply bus 216 is high, the thermal management controller 350 may increase the speed of the pump 330, such as by adjusting the PWM signal, or changing to a higher speed setting. (804) The speed of the pump 330 may be increased since the energy storage device 240 temperature has increased due to the load being supplied by the energy storage device 240. After the thermal management controller 350 successfully changes the speed setting, the operation may return to again confirm there is no failure condition or malfunction. (802)

If the power output of the aircraft engine supply bus 216 is not high according to the sensor data, the thermal management controller 350 may determine if the power output of the aircraft engine supply bus 216 is below a predetermined threshold, based on the sensor data received from the HVDC controller circuitry 252. (816) If the thermal management controller 350 determines the power output of the aircraft engine supply bus 216 is low, the thermal management controller 350 may decrease the speed of the pump 330 (808) and the operation may return to assessment of possible failure conditions. (802) If the thermal management controller 350 determines the power output of the aircraft engine supply bus 216 is not low, the operation may return to assessment of possible failure conditions. (802)

In the operational example of FIG. 8, a failure priority is provided such that high pressure conditions have highest priority, followed by high or low temperature with power levels being the lowest priority. In other examples, other priority arrangements may be used. Also, closed loop control is possible, as well as "cascade control" for multiple objectives using the controllers. The failure priority inherently assumes inability to control the pump 330, however, in the event of failures which do not impact pump control, wherever possible, such non-impacting situations may not set the pump 330 to high speed. Also, in examples, speed control state transitions may be gated by persistence counting, and state transitions/entry may also include command ramp up/down functions to enhance control.

Although the example of FIG. 8 references functionality of specific controllers, other types and numbers of controllers may be used. In summary the group of controllers include the following:

Outputs:

Speed command (or other variable flow rate) output, continuous variable pump speed control or quantized step changes in speed (given example is 2 or 3 speed levels)

Pump on/off command (thermal management controller 350 commands via the LVPDU 602 in the example system)

Inputs:

Power and/or Power demand input based on bus voltages and currents provided by sensors 254 on the aircraft engine bus 216.

Temperature input(s) from sensors 316 and 318 at the inlet and outlet of the thermal management system 260 and from temperature sensor 314 on the energy storage device 240.

Pressure input(s) from sensors 316 and 318 at the inlet and outlet of the thermal management system 260.

Operational Cases:

Control to slow speed of the pump 330 for high pressure conditions of thermal management fluid, or thermal management fluid being cold/glycol.

Control to increase speed of the pump 330 for high power output by the energy storage system 232 or high temperature of the energy storage system 232.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a thermal management system for an energy storage system for an aircraft, the thermal management system comprising:

a pump to circulate a thermal management fluid through at least part of the thermal management system and an energy storage device of the aircraft;

a controller circuitry configured to control a variable pumping capacity of the pump; and a sensor in communication with the controller circuitry, the sensor sensing at least one of pressure and temperature of the thermal management fluid at the energy storage device;

wherein the controller circuitry is further configured to default operation of the pump to a first pumping capacity in response to the pressure or temperature being within a predetermined operating range and at least one of a predetermined failure condition or a power demand for an aircraft engine supply bus exceeding a predetermined threshold, and the controller circuitry configured to control operation of the pump to a second pumping capacity in response to absence of the power demand for the aircraft engine supply bus and the pressure or temperature being within the predetermined operating range, wherein the first pumping capacity is greater than the second pumping capacity.

A second aspect relates to the thermal management system of the first aspect, wherein the controller circuitry is configured to control a variable speed of the pump to control the variable pumping capacity.

A third aspect relates to the thermal management system of the first or second aspect, wherein the controller circuitry is configured to dynamically control the variable speed of the pump with a pulse width modulated control signal.

A fourth aspect relates to the thermal management system of the first aspect, wherein the controller circuitry controls the variable pumping capacity of the pump to any of a plurality of discrete speeds, and the first pumping capacity is a first discrete speed of the pump, and the second pumping capacity is a second discrete speed of the pump.

A fifth aspect relates to the thermal management system of any of the preceding aspects one through four, wherein the controller is further configured to control the pump to the second pumping capacity at a time of startup of the pump.

A sixth aspect relates to the thermal management system of any of the preceding aspects one through five, wherein the controller circuitry is configured to control the variable pumping capacity of the pump with a pulse width modulated control signal, and a constant voltage override control signal is also supplied to the pump.

A seventh aspect relates to the thermal management system of any of the preceding aspects one through six, wherein the constant voltage override control signal is supplied to the pump through a pull-up resistor in parallel with the pulse width modulated control signal such that the constant voltage override control signal automatically controls the pump to the first pumping capacity in response to loss of the pulse width modulated control signal.

An eighth aspect relates to the thermal management system of the sixth aspect, further comprising a DC:DC converter selectively supplied by the energy storage device or a generator driven by a gas turbine engine of the aircraft, the DC:DC converter supplying the constant voltage override control signal.

A ninth aspect relates to the thermal management system of the sixth aspect, wherein the constant voltage override control signal controls operation of the pump to operate at the first pumping capacity.

A tenth aspect relates to the thermal management system of any of the preceding aspects one through nine, wherein the energy storage device is a battery.

An eleventh aspect relates to the thermal management system of any of the preceding aspects one through ten, wherein the controller is configured to control operation of the pump to the first pumping capacity in response to at least one of the power demand on the aircraft engine supply bus, the pressure or temperature being outside the predetermined operating range, or the predetermined failure condition, wherein the first pumping capacity is a predetermined maximum pumping capacity.

A twelfth aspect relates to a method of thermal energy management for an energy storage system for an aircraft, the method comprising:

pumping, with a pump, a thermal management fluid through at least part of a thermal control system and an energy storage device of the aircraft;

controlling a variable pumping capacity of the pump with a controller circuitry;

sensing with a sensor at least one of pressure and temperature of the thermal management fluid at the energy storage device;

receiving a sensor signal from the sensor with the controller circuitry;

the controller circuitry defaulting operation of the pump to a first pumping capacity when the pressure or temperature is within a predetermined operating range and at least one of a predetermined failure condition or a power demand for an aircraft engine supply bus exceeds a predetermined threshold; and the controller controlling operation of the pump to a second pumping capacity that is less than the first pumping capacity when the power demand signal for the aircraft engine supply bus is absent and the pressure or temperature is within the predetermined operating range.

A thirteenth aspect relates to the method of the twelfth aspect by further comprising dynamically controlling, with the controller circuitry, a variable speed of the pump to control the variable pumping capacity by dynamically varying power supplied to the pump.

A fourteenth aspect relates to the method of the thirteenth aspect, wherein dynamically varying the power supplied to the variable speed pump comprises the controller circuitry dynamically varying a pumping capacity of the pump with a pulse width modulated control signal.

A fifteenth aspect relates to the method of the fourteenth aspect, further comprising automatically controlling the pump with a constant voltage override control signal when the pulse width modulated control signal is lost, the constant voltage override control signal increasing the pump to the first pumping capacity.

A sixteenth aspect relates to the method of the fifteenth aspect, further comprising selectively supplying power to a DC:DC converter by the energy storage device or a generator driven by a gas turbine engine of the aircraft, wherein powering the pump with the constant voltage override control signal comprises supplying the constant voltage override control signal with the DC:DC converter.

A seventeenth aspect relates to the method of any of aspects twelve to sixteen, wherein the controller circuitry defaulting operation of the pump to the first pumping capacity comprises the controller circuitry controlling the pump to a first discrete speed of the pump and the controller controlling operation of the pump to a second pumping capacity comprises the controller circuitry controlling the pump to a second discrete speed of the pump.

An eighteenth aspect relates to the method of any of aspects twelve to seventeen, further comprising controlling, with the controller circuitry, operation of the pump to the first pumping capacity that is a maximum capacity in response to at least one of the power demand on the aircraft engine supply bus, the pressure or temperature being outside the predetermined operating range, or the predetermined failure condition.

A nineteenth aspect relates to the method of aspect eighteen, wherein the controller controlling operation of the pump to the second pumping capacity comprises control the pump to the second pumping capacity at a time of startup of the pump, and controlling, with the controller circuitry, operation of the pump to the first pumping capacity that is a maximum capacity comprises defaulting the pump to the first pumping capacity at all times other than the time of startup.

A twentieth aspect relates to the method of any of aspects twelve to nineteen, wherein the energy storage device is a battery, and controlling the variable pumping capacity of the pump with the controller circuitry comprise managing a temperature of the battery.

In addition to the features mentioned in each of the independent aspects enumerated above, some examples may show, alone or in combination, the optional features mentioned in the dependent aspects and/or as disclosed in the description above and shown in the figures.

What is claimed is:

1. A thermal management system for an energy storage system for an aircraft, the thermal management system comprising:

a pump to circulate a thermal management fluid through at least part of the thermal management system and an energy storage device of the aircraft;

a power controller configured to control voltage output and current output of a power converter of the aircraft, the power converter configured to convert a voltage level of power received from the energy storage device, wherein the power converter is thermally managed by the thermal management fluid circulated by the pump;

a pump controller configured to directly control, responsive to signals received from the power controller, a variable pumping capacity of the pump; and a sensor in communication with the power controller, the sensor sensing at least one of pressure and temperature of the thermal management fluid at the energy storage device;

wherein, to control the variable pumping capacity of the pump, the power controller is configured to:

determine, based at least in part from data received via the sensor, a target pumping capacity of the pump;

control the pump to operate at the target pumping capacity;

determine whether a pump control failure condition of the power controller has occurred in which the signals from the power controller do not reach the pump controller such that the power controller is unable to control the pump to operate at an arbitrary target pumping capacity; and responsive to determining that the pump control failure condition has occurred, increase the variable pumping capacity of the pump to a maximum pumping capacity.

2. The thermal management system of claim 1, wherein the pump controller is configured to directly control a variable speed of the pump to control the variable pumping capacity of the pump.

3. The thermal management system of claim 2, wherein the pump controller is configured to directly control the variable speed of the pump with a pulse width modulated control signal.

4. The thermal management system of claim 1, wherein the pump controller directly controls the variable pumping capacity of the pump to any of a plurality of discrete speeds.

5. The thermal management system of claim 1, wherein the pump controller is configured to directly control the pump to a first pumping capacity at a time of startup of the pump and a second pumping capacity in response to the power controller determining that the pump control failure condition of the power controller has occurred.

6. The thermal management system of claim 1, wherein a constant voltage override control signal is supplied to the pump and wherein the pump controller is configured to directly control the variable pumping capacity of the pump with a pulse width modulated control signal.

7. The thermal management system of claim 6, wherein the constant voltage override control signal is supplied to the pump through a pull-up resistor in parallel with the pulse width modulated control signal, and wherein the constant voltage override control signal automatically controls the pump to increase the variable pumping capacity of the pump in response to loss of the pulse width modulated control signal.

8. The thermal management system of claim 6, wherein the power converter is a DC: DC converter selectively supplied by the energy storage device or a generator driven by a gas turbine engine of the aircraft, the DC: DC converter supplying the constant voltage override control signal.

9. The thermal management system of claim 1, wherein the energy storage device is a battery.

10. A method of thermal energy management for an energy storage system for an aircraft, the method comprising:

pumping, with a pump, a thermal management fluid through at least part of a thermal control system and an energy storage device of the aircraft;

controlling, by a pump controller and responsive to signals received from a power controller, a variable pumping capacity of the pump wherein, the power controller is configured to control voltage output and current output of a power converter of the aircraft, the power converter configured to convert a voltage level of power received from the energy storage device, wherein the power converter is thermally managed by the thermal management fluid pumped by the pump;

sensing with a sensor in communication with the power controller at least one of pressure and temperature of the thermal management fluid at the energy storage device;

determining, by the power controller and based at least in part from data received via the sensor, a target pumping capacity of the pump;

controlling, by the power controller, the pump to operate at the target pumping capacity;

determining, by the power controller, whether a pump control failure condition of the power controller has occurred in which the signals from the power controller do not reach the pump controller such that the power controller is unable to control the pump to operate at an arbitrary target pumping capacity; and responsive to determining that the pump control failure condition has occurred, increasing the variable pumping capacity of the pump to a maximum pumping capacity.

11. The method of claim 10, further comprising controlling, with the pump controller, a variable speed of the pump to control the variable pumping capacity of the pump.

12. The method of claim 10, further comprising dynamically varying power supplied to the pump by the pump controller dynamically varying a pumping capacity of the pump with a pulse width modulated control signal.

13. The method of claim 12, further comprising automatically controlling the pump with a constant voltage override control signal when the pulse width modulated control signal is lost, the constant voltage override control signal increasing the variable pumping capacity of the pump.

14. The method of claim 13, wherein the power converter is a DC: DC converter and power is selectively supplied to the DC: DC converter by the energy storage device or a generator driven by a gas turbine engine of the aircraft, wherein powering the pump with the constant voltage override control signal comprises supplying the constant voltage override control signal with the DC: DC converter.

15. The method of claim 10, wherein the pump controller directly controls the variable pumping capacity of the pump to any of a plurality of discrete speeds.

16. The method of claim 10, further comprising controlling, with the pump controller, operation of the pump to a first pumping capacity at a time of startup of the pump and a second pumping capacity in response to the power controller determining that the pump control failure condition of the power controller has occurred.

17. The method of claim 10, wherein the energy storage device is a battery.

* * * * *